United States Patent [19]

Mori

[11] 4,331,986

[45] May 25, 1982

[54] APPARATUS AND METHOD FOR MAGNETIC TAPE DRIVE CONTROL

[75] Inventor: Masahito Mori, Hadano, Japan

[73] Assignee: Hitachi, Ltd., Tokyo, Japan

[21] Appl. No.: 136,730

[22] Filed: Apr. 2, 1980

[30] Foreign Application Priority Data

Apr. 4, 1979 [JP] Japan .................................. 54/39829

[51] Int. Cl.³ ...................... G11B 15/18; G11B 19/02; G11B 17/00
[52] U.S. Cl. .................................... 360/71; 360/72.1; 360/74.4
[58] Field of Search ........................ 360/71, 74.4–74.6, 360/72.1, 72.2, 74.1

[56] References Cited

U.S. PATENT DOCUMENTS 3,781,490 12/1973 Phillips ................................. 360/71
4,180,839 12/1979 Neff ..................................... 360/71

FOREIGN PATENT DOCUMENTS 590821 2/1978 U.S.S.R. ................................ 360/71
622158 2/1978 U.S.S.R. ................................ 360/71

Primary Examiner—John H. Wolff
Attorney, Agent, or Firm—Craig and Antonelli

[57] ABSTRACT

A tape drive control apparatus and method for a magnetic tape recording and reproducing system are provided to prevent a failure of the read and write operations due to frequent start and stop actions of the magnetic tape. The magnetic tape has a certain resonance frequency between a read/write magnetic head and a tape guide of the system. When the rate of start and stop actions of the tape approaches the resonance frequency adverse vibration of the tape becomes large in magnitude. To prevent such tape vibration delay a delay circuit is provided to delay the start of the magnetic tape for the subsequent data block when the length of the preceding data block is within a predetermined range.

12 Claims, 7 Drawing Figures

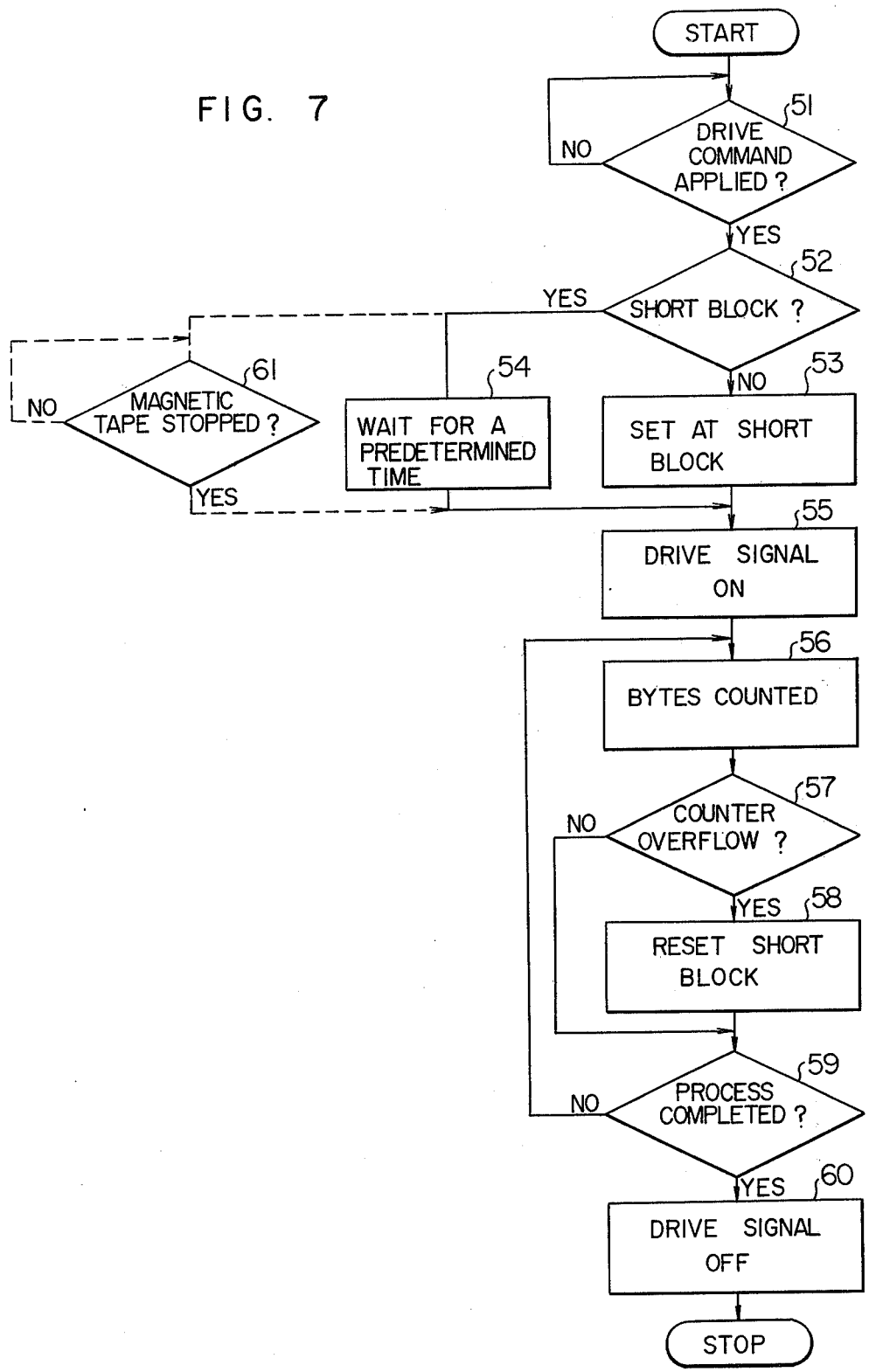

APPARATUS AND METHOD FOR MAGNETIC TAPE DRIVE CONTROL

BACKGROUND OF THE INVENTION

1. Field of the Invention

The present invention relates to an apparatus and a method for driving magnetic tape, or more in particular to an apparatus and method for controlling the period of start and stop thereof.

2. Description of the Prior Art

In recent years, the recording density of magnetic tape means has been increased remarkably. This means a smaller magnetization area or a smaller magnetization power for each bit. As a result, it is necessary that in operation the magnetic tape and the magnetic data recording-reproduction head be in closer contact with each other. If a gap exists therebetween, data bits may not to be read or written.

The improved recording density, on the other hand, shortens the tape length required for one data block. For this reason, the magnetic tape is now started and stopped at a higher repetition frequency than ever before. The magnetic tape is supported by a magnetic head and a tape guide located near to the magnetic head. In the case where the repetition frequency of start and stop of the magnetic tape is approximate to the resonance frequency of the magnetic tape determined by the distance between the magnetic head and the tape guide, the tension variations generated by the start and stop of the magnetic tape causes a resonance vibration of the tape, thereby causing a large vibration of the magnetic tape. As a result, a gap occurs between the magnetic tape and the magnetic head, thus causing a failure of recording or reproducing part of the required data.

SUMMARY OF THE INVENTION

Accordingly, it is an object of the present invention to provide an apparatus and method for magnetic tape drive control in which the vibrations of the magnetic tape are reduced.

To the extent that data are recorded or reproduced while starting and stopping the magnetic tape, vibrations of the magnetic tape caused by tension vibrations are unavoidable. According to the present invention, in view of the fact that the vibrations of the magnetic tape increase accordingly as the frequency of start and stop of the magnetic tape approximates to the resonant frequency of the magnetic tape, the range of the start-stop frequency i.e., the number of starts and stops which is accompanied by an amplitude which is likely to cause the failure of recording or reproducing the data is predetermined, so that the timing of start and stop is controlled to avoid such a range.

BRIEF DESCRIPTION OF THE DRAWINGS

FIG. 7 is a flow chart for explaining the operation of the embodiment shown in FIG. 5.

DESCRIPTION OF THE PREFERRED EMBODIMENTS

Figure 1:
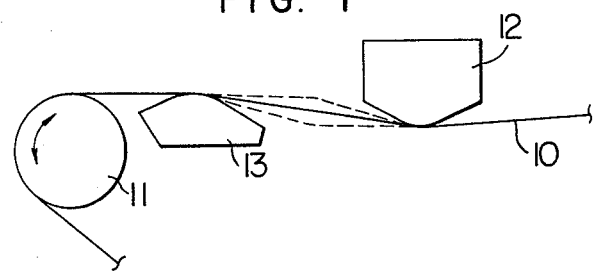
FIG. 1 is a diagram showing part of the running path of the magnetic tape.

The diagram of FIG. 1 shows a tape running path around the magnetic head for explaining the vibrations of the magnetic tape. The magnetic tape 10 is fed between a pair of reels (not shown) by rotation of a capstan 11. A magnetic head 12 is arranged on the running path of the magnetic tape 10 in contact therewith for recording and reproduction. Numeral 13 shows a tape guide.

In this embodiment, the tape guide 13 is located adjacent to the magnetic head 12 as shown. This tape guide may be replaced by a guide roller with equal effect. The magnetic tape 10 which is caused to be fed in close contact with the magnetic head 12 by a guide member such as the tape guide 13 has an inherent frequency determined by the distance between the magnetic head 12 and the tape guide 13.

The magnetic tape 10 is started and stopped for reading and writing a data block. The time length during which the magnetic tape runs is determined substantially by the length of the data block. The time length during which the magnetic tape stops, on the other hand, is substantially specific to a magnetic tape memory system depending on the hardware and program for issuing a command to read or write a data block following the processing of the preceding data block. The vibration of the magnetic tape 10 is caused by the change in tension at the time of start and stop thereof. When the start-stop rate of the tape approaches the resonance frequency determined by the distance between the head and the guide, i.e., both the stop time and the running time of the tape coincide with the resonance period, resonance vibration will occur. In many cases, the stop time coincides with the above-mentioned resonant period. Therefore, as the running time of the magnetic tape 10 approximates to the resonant frequency depending on the length of the data block, the vibrations are increased, resulting in an error in the data read and write operation.

If a data block is shorter than a predetermined length, the stoppage time following that data block is lengthened by delaying the next start of the magnetic tape, thus preventing resonance.

Figure 2:
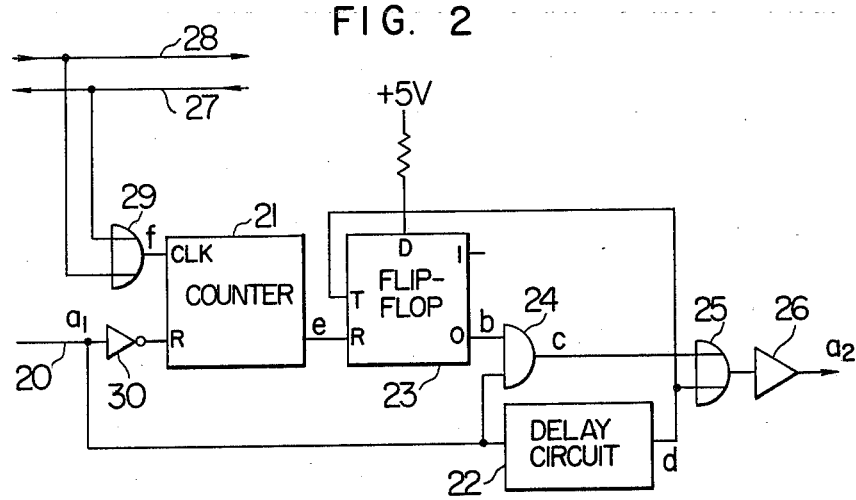
FIG. 2 is a diagram showing an embodiment of the present invention.

An embodiment of the present invention is shown in FIG. 2. A signal line 27 is for transmitting a signal generated for each byte in synchronism with the data read from the magnetic tape. A signal line 28 is for transmitting a similar signal for the data written. These signals are used for control of data transfer in conventional magnetic tape control systems. Numeral 21 shows a counter. During the period when this counter 21 is not reset, it counts a signal on signal line 27 or 28 transferred through an OR gate 29.

Figure 4:
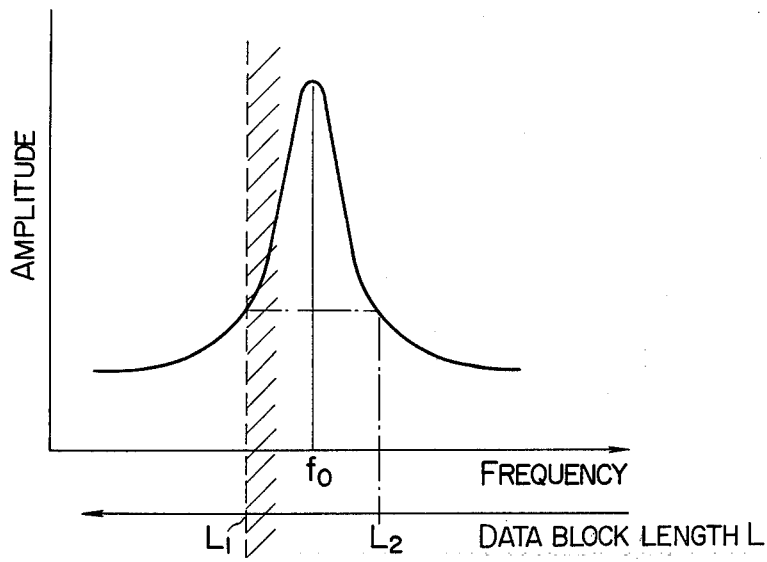
FIG. 4 is a diagram for explaining the controlling process in FIG. 2.

A diagram for explaining the control system of the embodiment of FIG. 2 is shown in FIG. 4. The abscissa represents the frequency of start and stop, and the ordinate represents the amplitude of the magnetic tape vibrations. Reference character $f_0$ shows a resonant frequency. The length of the data block is in opposite relation as shown to the above-mentioned start-stop frequency. In the embodiment of FIG. 2, it is assumed that the vibration amplitude is likely to cause an error when the length of the data block associated with the preceding read-write command is located in the region on the right side of the dashed line in FIG. 4, that is, exceeds a threshold or limit. And the tape drive in response to the subsequent read-write command is delayed, thereby accomplishing a control in such a manner that the start-stop frequency is located outside of this particular region. The counter 21 is so constructed as to generate a signal e when it counts the number of bytes equal to the block length $L_1$ at the point crossing the dashed line in FIG. 4. A drive command $a_1$ for instructing the magnetic tape drive through a program is inverted by an inverter 30 and is then applied to a reset terminal R of the counter. Therefore, the counter 21 operates only during the presence of the drive command $a_1$ and is reset upon completion of the drive command $a_1$. When the read/write operation for the next data block is ready by the program the drive command $a_1$ is generated at line 20.

A flip-flop 23 is reset and produces a signal b in response to the signal e applied to the reset terminal R. The data terminal D is kept impressed with a voltage of +5 V, i.e., the data "1," so that the flip-flop 23 is set upon application of a signal d to the trigger terminal T (described later). The signal b passes through an AND gate 24 opened by the signal $a_1$, and through an OR gate 25, amplified to an appropriate value at a transmitter 26 from which it is transmitted as a drive signal $a_2$ for driving the magnetic tape. On the other hand, the rise of the signal $a_1$ is delayed by an appropriate time length by a delay circuit 22 in order that the frequency of tape start may not be included in the adverse resonance region even if the preceding data block is short. As a result, a signal d is produced from the delay circuit 22. This signal is applied to the OR gate 25 on the one hand and applied to the trigger terminal T on the other hand as mentioned above.

The running time of the magnetic tape does not coincide with the time actually required for reading and writing a data block, although the length of the data block is proportional to the running time length. By determining the length of the data block, therefore, it is possible to know the frequency of start and stop of the magnetic tape.

Figure 3:
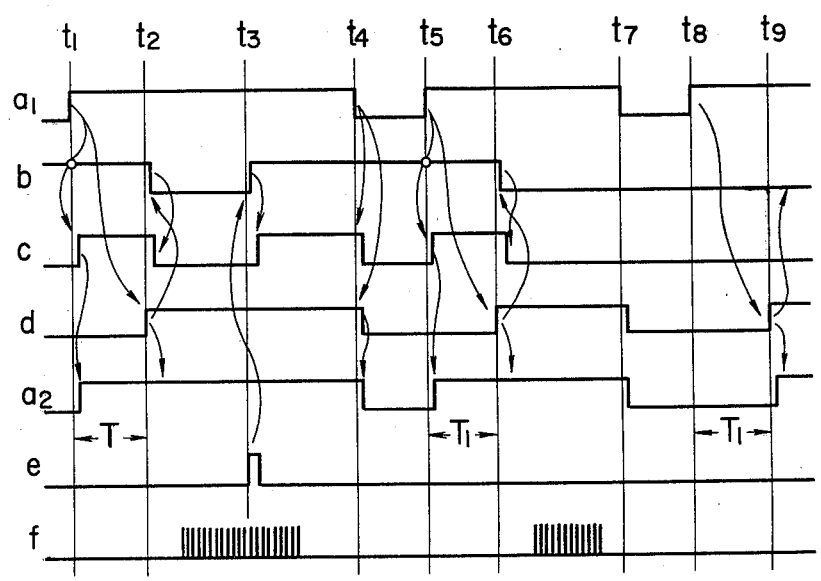
FIG. 3 is a time chart for explaining the operation thereof.

Next, the operation of the circuit shown in FIG. 2 described above will be explained below with reference to the time chart of FIG. 3. Assuming that the magnetic tape is being driven, the signal $a_1$ is at a high level. Therefore, the counter 21 operates and counts input signals f. When a predetermined number is counted, the counter 21 produces the signal e. As a result, the flip-flop 23 which is reset at the rise of the signal d at the time point $t_2$ is again reset, thus raising the signal b to a high level. Upon completion of the magnetic tape drive command, the signal $a_1$ falls and the signal d is reduced to a low level so that the drive signal $a_2$ is also rendered to a low level, thus stopping the driving of the magnetic tape. Next, with the rise of the subsequent drive command at time point $t_5$, the signal $a_1$ is raised to high level. In view of the fact that the preceding data block is longer than a predetermined length, the signal b is at high level. Specifically, the flip-flop 23 memorizes whether or not the preceding data block is longer than a predetermined length. Immediately after the signal c is raised to a high level, therefore, the signal $a_2$ is raised to high level thus driving the magnetic tape. After a delay time $T_1$, the signal d rises, in response to which the flip-flop 23 is set and the signal b falls. At the same time, the signal c is also turned to low level. In spite of this, the signal $a_2$ is kept high in view of the fact that the signal d is at high level. If the data block is short, in contrast, the signal e is not produced, thus keeping the signal b at low level. Upon completion of the magnetic tape drive command, the signal $a_1$ is turned to low level, so that the signal $a_2$ is turned to low level, thus stopping the driving of the magnetic tape.

At the time point $t_8$ when the next drive command is applied, the signal $a_1$ rises while the signal c is kept at low level because the signal b is at low level. Therefore, the magnetic tape is not driven. After a delay time $T_1$ through the delay 22, the signal d is raised to high level at time point $t_9$, thus driving the magnetic tape.

As explained above, in the case where the immediately preceding data block written or read is longer than a predetermined length, the next read/write command, for the data block, immediately drives the magnetic tape. If the immediately preceding data block written or read is shorter than a predetermined length, on the other hand, the magnetic tape is driven only after a predetermined delay time $T_1$.

This construction prevents the occurrence of any interval of start and stop of the magnetic tape which causes a high-magnitude vibration.

Figure 5:
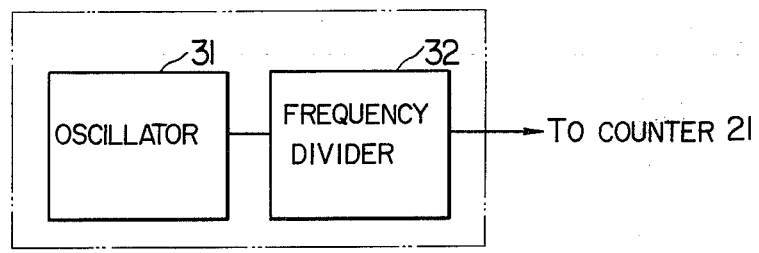
FIG. 5 is a diagram showing another embodiment of the present invention.

Another embodiment of the present invention is shown in FIG. 5. The input signal to the counter 21 is made up of pulses in which repetition pulses of an oscillator 31 are frequency-divided appropriately by a frequency divider circuit 32. The counter 21 is so constructed as to continue counting the input signals from the frequency-divider circuit 32 during the presence of the drive command and to produce a signal e after counting the number equivalent to the time length from $t_1$ to $t_3$ in FIG. 3.

In the embodiment of FIG. 2, the delay circuit 22 is operated in all cases where the data block (maximum data block length) is shorter than $L_1$ below which an error is likely to occur. In view of the fact that such a delay operation is not required for the data blocks longer than $L_2$ in FIG. 4, however, it is possible to avoid the delay in the cases of such blocks. This is easily realized by the construction in which the counter 21 produces a signal after counting a predetermined amount of data, which signal is used to set the flip-flop 23, and in which as in the case of FIG. 2, the signal e is produced when a predetermined upper limit amount is counted, so that this signal e or the rise thereof is used to reset the flip-flop 23.

Further, in the embodiment of FIG. 2, the tape drive signal $a_2$ is delayed only by delaying the tape drive command $a_1$. Instead, the tape drive signal $a_2$ may be produced on the condition that the operating time by the preceding tape drive signal is such that the amplitude of tape vibrations is of a magnitude likely to cause an error and the magnetic tape is completely stationary. In such a case, the delay circuit 22 of FIG. 2 is replaced by an AND gate, which is impressed with a magnetic tape-stop signal from the magnetic tape recorder.

Figure 6:
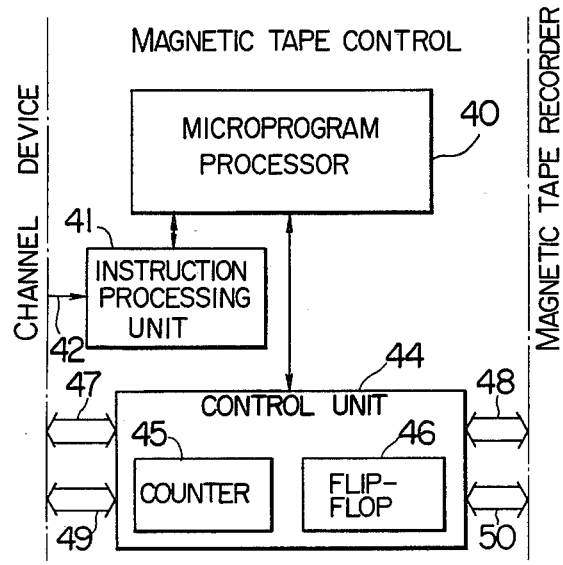
FIG. 6 is a diagram showing still another embodiment of the present invention.

Still another embodiment of the present invention is shown in FIG. 6. The circuit shown in this block diagram embodies the present invention under a microprogram control. A flow chart for explaining the operation of the circuit of FIG. 6 is shown in FIG. 7. A magnetic tape control apparatus is connected to a magnetic tape recorder and a channel device for data transfer with the CPU which includes as a part thereof the magnetic tape recorder. The magnetic tape control apparatus includes a microprogram processor 40 for storing a microprogram. The magnetic tape control apparatus receives at an instruction processing circuit 41 a magnetic tape drive command through a line 42 from the channel device. A control unit 44 is operated under the control of the microprogram processor device 40 for transferring data through lines 47 and 48. The control unit 44 also transfers various types of state data through lines 49 and 50. The control unit 44 is provided with a counter 45 and a short block data storing flip-flop 46 which are directly related to the present invention. A circuit disclosed in FIG. 8 of the U.S. Pat. No. 3,821,703 is used as the control unit 44. The counter 45 is connected in such a manner as to count the output of the OR gate 493 in FIG. 17-1 of the same patent, and the output of counter 45 is connected to the flip-flop 46.

Referring to FIG. 7, a processing block 51 determines whether or not a magnetic tape drive command is received from the channel device. Upon receipt of a magnetic tape drive command, a processing block 52 decides whether the processing in response to the preceding magnetic tape drive command has a data block shorter than a predetermined length, on the basis of the condition of the flip-flop 46. That is to say, the value in the flip-flop 46 is read out and it is decided whether its value is "0" or "1." If the data block is not shorter than the predetermined length, a processing block 53 sets the flip-flop 46, and transfer is made to a processing block 55 for producing a tape drive signal. This signal is applied to the magnetic tape apparatus through a line 48.

In the case where the processing block 52 determines that the data block is shorter than the predetermined length, that is, a short-block condition by contrast, transfer is made to the processing block 55 only after waiting for a certain length of time at a processing block 54. Next, at a processing block 56, the counter 45 counts the number of bytes of the data recorded or reproduced. Transfer is then made to a processing block 57, where it is decided whether or not the counter 45 has overflowed. If the counter 45 has not overflowed, transfer is made to a processing block 59. When the counter 45 overflows, by contrast, the flip-flop 46 is reset at a processing block 58 and then transfer is made to the processing block 59. The processing block 59 determines whether or not the processing based on the tape drive command has been completed. If it is not completed, transfer is made back to the block 56. If the required processing is complete, on the other hand, transfer is made to a processing block 60, thus turning off the magnetic tape drive signal.

If a processing block 61 is provided in place of the processing block 54, it is possible to turn on the tape drive signal after the magnetic tape has come to a complete stop.

I claim:

1. Magnetic tape controlling apparatus for use in a data read and write system, receiving a magnetic tape transporting instruction and generating a first signal by which a magnetic tape is transported, comprising:
    a counter counting pulse signals during the presence of said instruction, and generating a second signal indicating that the count value of said counter is more than a predetermined number,
    memory means connected to said counter for storing said second signal,
    delay means for generating a third signal which rises at a delayed beginning point of said instruction and falls at an ending point of said instruction,
    said memory means being cleared at a rising point of said third signal, and
    means for generating said first signal when said third signal is existing or when said memory means is storing said second signal during the presence of said instruction.

2. Magnetic tape controlling apparatus as provided in claim 1, wherein said counter counts pulses, each of which is representative of a byte of data to be read or written out of or into a magnetic tape.

3. Magnetic tape controlling apparatus as provided in claim 1, wherein said counter counts clock pulses generated with a predetermined time interval.

4. Magnetic tape controlling apparatus as provided in claim 1, wherein said memory means comprises a triggerable type flip-flop circuit having a data terminal, trigger terminal, a reset terminal and an output terminal indicating that said second signal is stored, said data terminal being supplied with a positive voltage continuously, said trigger terminal being supplied with said third signal, and said reset terminal being supplied with said second signal.

5. Magnetic tape controlling apparatus for a magnetic tape recording and reproducing system which reads/writes various lengths of data blocks, comprising:
    means for determining if the length of a preceding data block which has been read/written is in a predetermined data block length range, and
    means responsive to said determining means for delaying the start of the magnetic tape for the next data block to be read/written when said length of said preceding data block is in said predetermined data block length range.

6. Magnetic tape controlling apparatus for a magnetic tape storage system which reads/writes various length of data blocks, comprising:
    (a) a determining circuit for determining if the length of a preceding data block which has been read/written is in a predetermined data block length range,
    said determining circuit comprising:
    means for counting a number of bytes of said preceding data block, and generating a first signal indicating that the number of said bytes is more than a predetermined number, and
    (b) means responsive to nonexistence of said first signal for delaying the start of the magnetic tape for the subsequent data block to be read/written.

7. Magnetic tape controlling apparatus for a magnetic tape storage system including a magnetic tape transported along a magnetic head and a tape guide, and having a resonance frequency of a start-stop rate of the magnetic tape which resonance frequency is an inherent characteristic of the distance between the magnetic head and the tape guide, comprising:
    means for determining if the start-stop rate of said magnetic tape is in a predetermined range which includes start-stop rates of said resonance frequency which cause a resonance vibration of the tape between the magnetic head and the tape guide, and
    means responsive to said determining means for controlling said start-stop rate to keep it outside said range.

8. Magnetic tape controlling apparatus as provided in claim 7 wherein said controlling means delays start of said magnetic tape so as to keep said start-stop rate outside said range.

9. Magnetic tape controlling apparatus for a magnetic tape storage system including a magnetic tape transported with various start/stop time intervals comprising:
   means for determining if a start-stop time interval of the tape is in a predetermined time range, and
   means responsive to said determining means for controlling said time interval to keep it out of said predetermined time range.

10. Magnetic tape controlling apparatus as provided in claim 9, wherein said controlling means delay start of said magnetic tape so as to keep said time interval out of said predetermined time range.

11. Magnetic tape controlling apparatus as provided in claim 9, wherein said determining means includes means for measuring the running time of said magnetic tape.

12. In a magnetic tape storage system issuing a magnetic tape transporting instruction and generating a first signal by which a magnetic tape is transported in accordance with said instruction which reads/writes various lengths of data blocks and includes a counter and a flip-flop circuit, said flip-flop circuit generating a second signal which indicates that said flip-flop circuit is in reset state, a magnetic tape controlling method comprising the steps:
   (a) detecting if said second signal exists,
   (b) starting transportation of the magnetic tape in response to said first signal with a predetermined time delay in the event of the absence of the second signal,
   (c) starting transportation of said magnetic tape in response to said first signal and setting said flip-flop circuit in the event of the presence of the second signal,
   (d) causing said counter to count a number of bytes of said data block read/written out of or into said magnetic tape after the step (b) or (c),
   (e) resetting said flip-flop circuit when the count value of said counter is more than a predetermined number, and
   (f) repeating the steps (a) through (e).

* * * * *